United States Patent [19]

Greene et al.

[11] Patent Number: 4,510,834
[45] Date of Patent: Apr. 16, 1985

[54] SIDING CUTTER

[76] Inventors: Dennis T. Greene, 612 Butler Springs Rd., Greenville, S.C. 29615; Glen M. Salyers, P.O. Box 231, Lyman, S.C. 29365

[21] Appl. No.: 492,507

[22] Filed: May 9, 1983

[51] Int. Cl.³ .............................................. B23D 23/02
[52] U.S. Cl. ........................................ 83/453; 83/464; 83/467 R; 83/559; 83/581; 83/694
[58] Field of Search ................ 83/694, 581, 559, 516, 83/517, 607–609, 464, 465, 467

[56] References Cited

U.S. PATENT DOCUMENTS

| 1,462,871 | 7/1923 | Rosenberg | 83/559 X |
| 2,249,814 | 7/1941 | Eastwood | 83/581 X |
| 3,134,285 | 5/1964 | Greene | 83/694 X |
| 3,455,197 | 7/1969 | Richardson | 83/559 X |
| 3,884,106 | 5/1975 | Aizawa | 83/581 X |

Primary Examiner—James M. Meister
Attorney, Agent, or Firm—Bailey & Hardaway

[57] ABSTRACT

A cutter is illustrated to have a pivoted support for adjusting the angle of cut of a piece of vinyl or aluminum siding which is held in a fixed position in longitudinal alignment.

5 Claims, 4 Drawing Figures

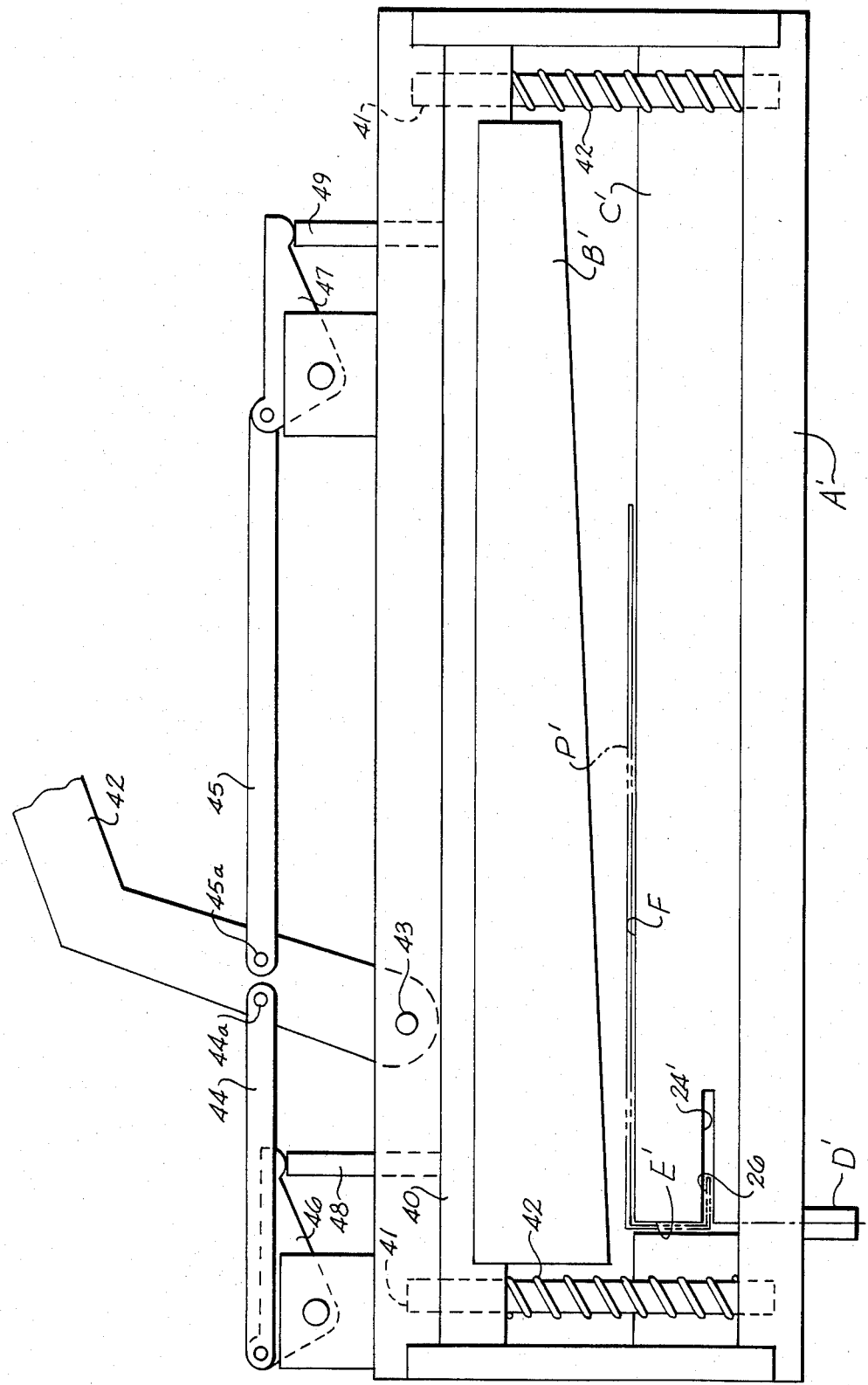

SIDING CUTTER

BACKGROUND OF THE INVENTION

During construction work when vinyl or aluminum siding is to be cut at an angle, the common practice is to use snips which are operated manually. Another prior art method in common use contemplates the use of jigs to hold the work while the operator utilizes a skill saw to cut the siding at a desired angle.

Prior art cutting apparatuses which are representative of the related art in cutting sheet material are illustrated in U.S. Pat. Nos. 1,119,506, 1,146,089, 1,439,556, 2,626,664, 3,410,166, and 3,491,643.

An important object of this invention is to provide a cutting apparatus employing complementary upper and lower blades which may be pivoted or may be of the guillotine type The blades may be pivoted with respect to a longitudinally aligned siding member and the like to impart a cutting action thereto at any desired adjustable angle.

SUMMARY OF THE INVENTION

It has been found that a cutter may be provided having complementary upper and lower blades which are pivoted about a point which serves to fix and locate the siding member at one edge while supporting the siding member substantially entirely thereacross during the cutting action.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 4 is a side elevation illustrating a modified form of the invention employing a guillotine blade with panel inserted from the end.

DESCRIPTION OF A PREFERRED EMBODIMENT

The drawings illustrate a vinyl and aluminum siding cutter having an elongated blade support A. A manually depressable elongated upper blade B is carried by the support. An elongated lower blade C is carried in alignment with the upper blade carried by the support. A pivotal mounting means D carries the elongated blade support for angular adjustment in respect to the siding. Stop means E are carried adjacent the lower blade fixing the siding during cutting. The lower blade has a surface F which, together with the stop means, supports the siding thereacross during cutting.

Figure 1:
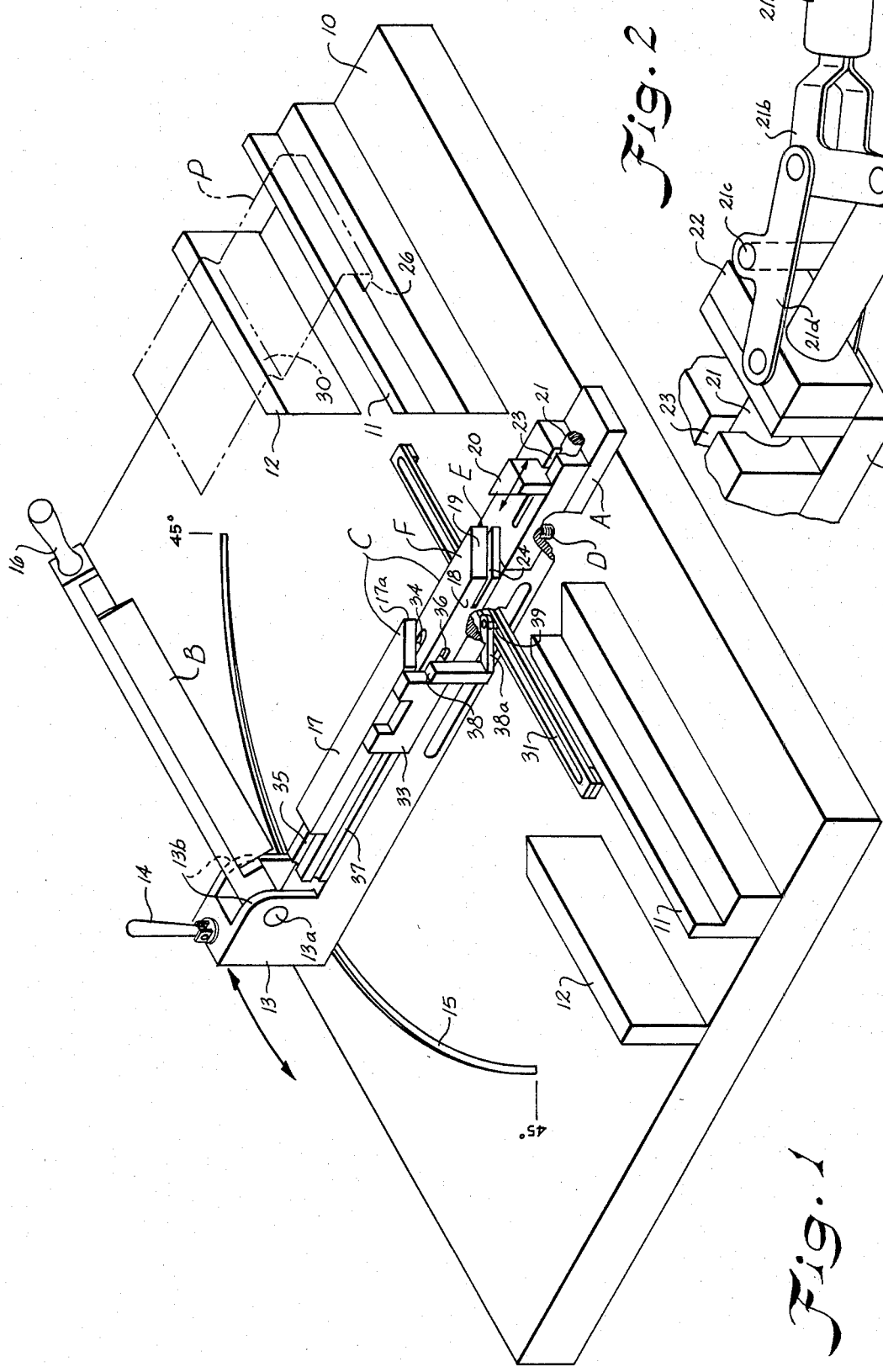
FIG. 1 is a perspective view illustrating a cutter constructed in accordance with the invention with means for clamping the siding in proper alignment at one edge about which the entire cutter may be pivoted for varying the angle of cut.
Figure 2:
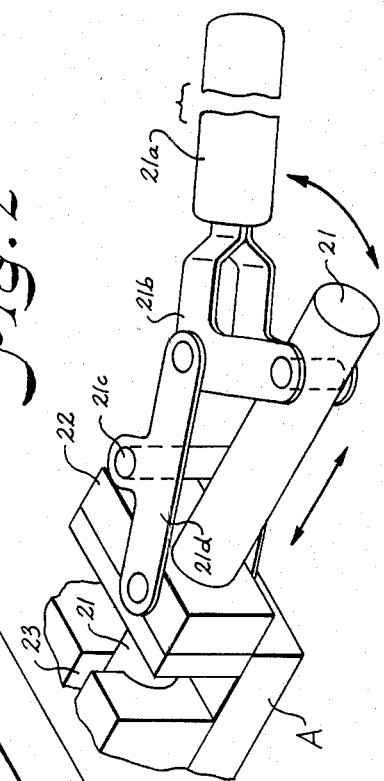
FIG. 2 is an enlarged perspective view illustrating an end stop and clamping means with operating mechanism therefor.

The cutter illustrated in FIG. 1 employs an enlarged flat base member 10 which carries supporting and aligning members 11 and 12 on each side of the cutter mechanism. The supporting and aligning members 11 and 12 carry the side panel P, which is illustrated in FIG. 1 in the form of a double panel, in longitudinal alignment with the base and with the cutter. The cutting apparatus, which includes the support A, is carried between the respective pairs of guiding and supporting members 11 and 12, and is pivoted on the base member as at D. At the other end of the support, mounting means 13 is positioned for carrying the blade B, in this case, in a pivotal manner. A locking mechanism includes a lever or handle 14 for fixing the support A adjacent the mounting means 13 in an arcuate track 15 which may be calibrated, as illustrated by the indicia 45° in the drawings, to indicate the angle of the blade mechanism with respect to the panel P. The manually depressable upper blade B is provided with a handle 16 which carries the blade member, and is pivoted as at 13a between the bifurcated bracket members 13b.

The lower blade members C include a suitable upper surface F, in this case formed by double blade members 17 and 18. The member 18 has an angular end portion 19 which affords a stop means E carried adjacent the lower blade fixing the siding P during cutting. The siding is clamped or captivated between the member E and an end stop member 20 which is carried by a rod 21. The rod 21 is carried for movement in direction of the arrow back and forth within the clamp mount 22 and a slot 23 within the carrier base for providing a guide for moving the end stop back and forth. The horizontal slot 24 in the end of the blade member C acts to receive and confine the bottom lock portion 26 of the panel P (FIGS. 1 and 4).

The double blade portions 18 and 19 must be positioned at all times so that the end of the upper member 17a may be positioned at all times in vertical alignment with the inside of the intermediate portion 30 between the two panel portions of the double panel siding member P. The point 17a is fixed along a longitudinal trackway 31 to insure proper positioning of the lower blade and its supporting surface F beneath the panel portions of the double panel.

It is to be noted that if a single panel is to be cut, a single lower blade member 18 may be provided without the upper portion 17.

Referring again to the positioning of the upper blade members 17, FIG. 1 illustrates the mounting of the member 17 upon a side bracket 33. A key 34 is provided for maintaining the upper blade member 17 within a slot 35, while a key 36 carries the brake member 33 in alignment with the slot 37. A side bracket 38 has an inwardly projection portion 38a which carries a pin 39 within the trackway 31. Thus, the pin 39 which is vertically aligned with the point 17a is maintained in alignment with the track at all times and thus adjacent, and preferably engaging, the intermediate panel portion 30.

Figure 3:
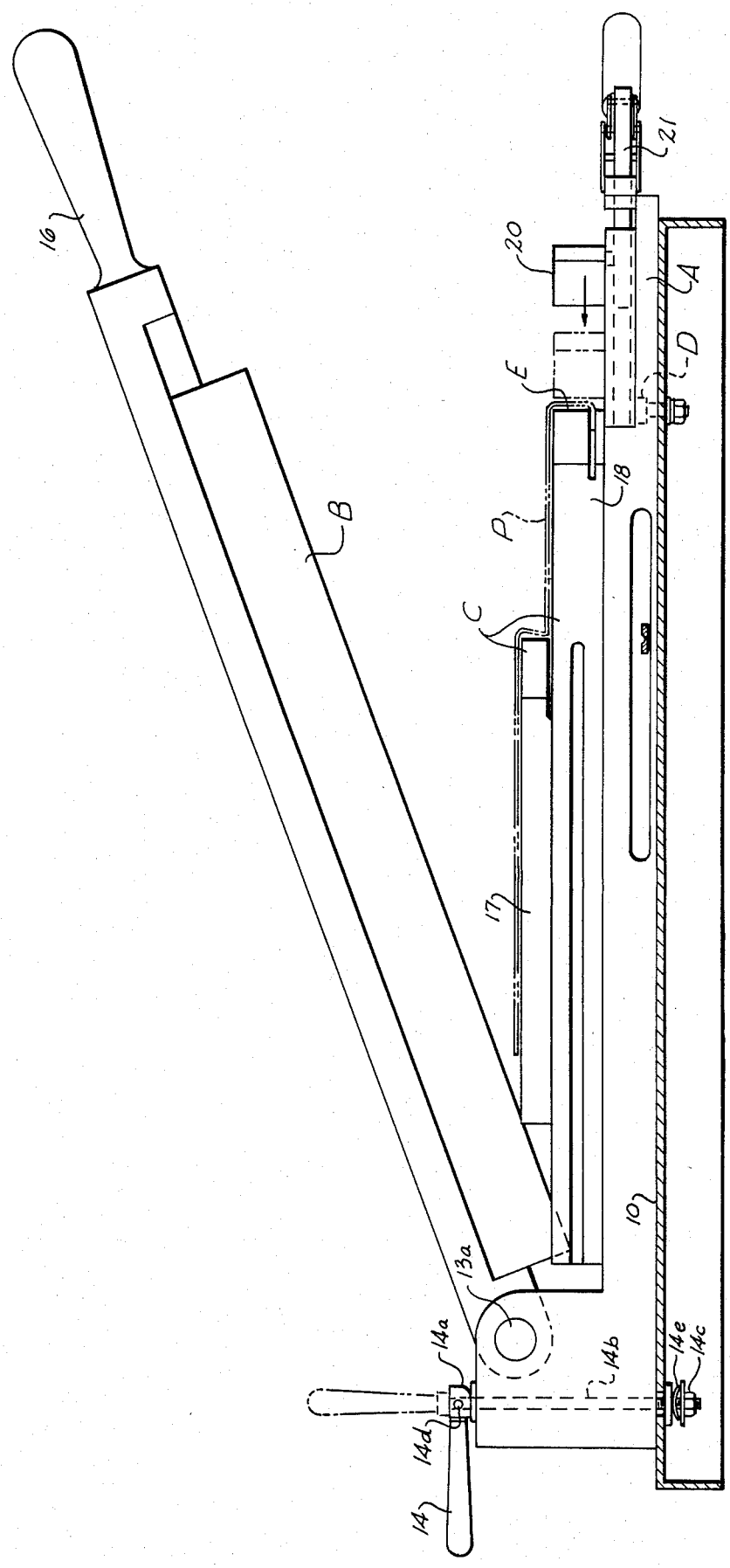
FIG. 3 is a side elevation, with parts omitted, further illustrating the clamping apparatus and relative positioning of a double siding panel therein inserted from the front.

Referring especially to FIG. 3, it will be noted that the locking member having the handle 14 is secured by a camming portion 14a which urges a shank portion 14b upwardly to clampingly engage a lower clamping portion including the nut 14c in locking position in the base member 10. The pivot point 14d is provided for the handle 14 while a spring washer 14e assures a proper clamping action.

Referring now to the end stop, the rod 21 is moveable in the direction of the arrow in FIG. 1 by movement of the handle 21a which through the link 21b moves the rod 21 inwardly. The pin 21c carries the pivoted link 21d and serves as a stop when the rod is in retracted position.

Referring now to FIG. 4, it will be noted that like parts are described with like reference characters with prime notations added. The upper blade B' is a guillotine type blade opposite a fixed lower blade C' which has a slot 24' for accommodating the bottom slot 26' of a single panel member against a surface E' of the lower blade which acts as a stop means fixing the single panel in longitudinal alignment. The panel is positioned by utilizing end insertion rather than as the side-inserted double panel illustrated above. The base A' has a pivot point D' in alignment with the stop means E' to ensure proper support for the panel in all angularly adjusted positions of the base.

The guillotine blade B' is carried by a blade carrier which is raised and lowered upon the guide pins 41. The pins are equipped with compression springs 42. The handle is pivoted as at 43 to move tie bars 44 and 45 which have pivotal connection thereto as at 44a and 45a to simultaneously raise and lower the respective links 46 and 47 to depress the push pins 48 and 49 to operate the guillotine blade.

It is thus seen that a simplified and versatile cutter has been provided for siding and the like which offers support all across the surface thereof and which restrains the sliding along an edge upon which the siding is positioned in longitudinal alignment for a variable angle cut.

While a preferred embodiment of the invention has been described using specific terms, such description is for illustrative purposes only and it is to be understood that changes and variations may be made without departing from the spirit or scope of the following claims.

What is claimed is:

1. A vinyl and aluminum siding cutter comprising:
an elongated blade support;
a manually depressable elongated upper blade carried by said support;
an elongated lower blade in alignment with said upper blade carried by said support;
a pivotal mounting means carrying said elongated blade support for angular adjustment in respect to said siding;
stop means carried adjacent said lower blade fixing said siding during cutting;
a surface carried by said lower blade and said stop means supporting said siding during cutting; and
said stop means and said pivotal mounting means being in vertical alignment.

2. The structure set forth in claim 1 wherein said stop means includes an end member of said lower blade with a horizontal slot opening therein to receive an edge portion of said siding.

3. The structure set forth in claim 2 including guiding and aligning members receiving said siding from the front, and clamping means moveable to captivate said edge portion of said siding.

4. The structure set forth in claim 1 including an upper portion carried by said lower blade and slidable therealong for pivoting on one end adjacent a longitudinal portion of said siding.

5. A vinyl and aluminum siding cutter comprising:
an elongated blade support;
a manually depressable elongated upper blade carried by said support;
an elongated lower blade in alignment with said upper blade carried by said support;
said lower blade including a sliding upper portion, and a longitudinal guide maintaining an end portion of said upper portion in the same relative position transversely of said siding;
pivotal mounting means carrying said elongated blade support for angular adjustment in respect to said siding;
stop means carried adjacent said lower blade fixing said siding during cutting;
a surface carried by said lower blade and said stop means supporting said siding thereacross during cutting; and
said stop means and said pivotal mounting means being in vertical alignment.

* * * * *